United States Patent
Hong et al.

(10) Patent No.: US 12,512,558 B2
(45) Date of Patent: Dec. 30, 2025

(54) SEPARATOR, PREPARATION METHOD THEREFOR AND RELATED SECONDARY BATTERY, BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Haiyi Hong, Ningde (CN); Jianrui Yang, Ningde (CN); Cong Cheng, Ningde (CN); Yuanyuan Lan, Ningde (CN); Na Liu, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/940,913

(22) Filed: Sep. 8, 2022

(65) Prior Publication Data

US 2023/0017049 A1    Jan. 19, 2023

Related U.S. Application Data

(63) Continuation of application No. PCT/CN2020/132954, filed on Nov. 30, 2020.

(51) Int. Cl.
*H01M 50/42* (2021.01)
*H01M 10/0525* (2010.01)
(Continued)

(52) U.S. Cl.
CPC ..... *H01M 50/446* (2021.01); *H01M 10/0525* (2013.01); *H01M 50/403* (2021.01);
(Continued)

(58) Field of Classification Search
CPC ............ H01M 50/446; H01M 50/403; H01M 50/491; H01M 50/494; H01M 50/451;
(Continued)

(56) References Cited

U.S. PATENT DOCUMENTS

| 11,814,483 B2 | 11/2023 | Jeon et al. |
| 2015/0188108 A1 | 7/2015 | Miyazawa et al. |

(Continued)

FOREIGN PATENT DOCUMENTS

| CN | 110010831 A | 7/2019 |
| CN | 110233223 A | 9/2019 |

(Continued)

OTHER PUBLICATIONS

Machine translation of JP2015-159067, retrieved from <www.espacenet.com> on Aug. 8, 2025.*

(Continued)

*Primary Examiner* — Cynthia K Walls
(74) *Attorney, Agent, or Firm* — K&L Gates LLP

(57) ABSTRACT

The present application relates to a separator, comprising a substrate and a coating formed on at least one surface of the substrate; wherein the coating comprises inorganic particles and organic particles, the organic particles comprise first organic particles and second organic particles both embedded in the inorganic particles and forming protrusions on the surface of the coating, the first organic particles have a number-average particle size of ≥8 μm; the second organic particles have a number-average particle size of ≥2 μm, and at least part of the second organic particles comprise a core structure and a shell structure. The present application also relates to a secondary battery comprising the separator, a device comprising the secondary battery and a method for preparing the separator.

18 Claims, 3 Drawing Sheets

(51) Int. Cl.
*H01M 50/403* (2021.01)
*H01M 50/417* (2021.01)
*H01M 50/446* (2021.01)
*H01M 50/449* (2021.01)
*H01M 50/489* (2021.01)

(52) U.S. Cl.
CPC ....... *H01M 50/417* (2021.01); *H01M 50/449* (2021.01); *H01M 50/489* (2021.01)

(58) Field of Classification Search
CPC ............ H01M 50/209; H01M 50/414; H01M 50/431; H01M 50/443; H01M 2220/20; H01M 2220/30; Y02E 60/10
See application file for complete search history.

(56) References Cited

U.S. PATENT DOCUMENTS

| | | | |
|---|---|---|---|
| 2019/0237734 A1* | 8/2019 | Lee | H01M 10/0565 |
| 2019/0280274 A1 | 9/2019 | Kim et al. | |
| 2021/0184311 A1 | 6/2021 | Lefebvre et al. | |
| 2021/0242533 A1 | 8/2021 | Asai | |
| 2021/0305573 A1* | 9/2021 | Arai | H01M 4/0404 |
| 2022/0123433 A1 | 4/2022 | Taguchi et al. | |
| 2022/0285722 A1 | 9/2022 | Sung et al. | |

FOREIGN PATENT DOCUMENTS

| | | | | |
|---|---|---|---|---|
| CN | 111244364 A | 6/2020 | | |
| CN | 111244365 A | 6/2020 | | |
| CN | 111492507 A | 8/2020 | | |
| CN | 111554860 A | 8/2020 | | |
| CN | 111653717 A | 9/2020 | | |
| CN | 111682149 A | 9/2020 | | |
| CN | 111916624 A | 11/2020 | | |
| CN | 113363672 A | 9/2021 | | |
| CN | 117397109 A | 1/2024 | | |
| EP | 2485295 A1 | 8/2012 | | |
| EP | 3522286 A1 | 8/2019 | | |
| JP | 2015-159067 | * | 9/2015 | ........ H01M 10/0525 |
| JP | 2019098203 A | 6/2019 | | |
| KR | 1020120091028 A | 8/2012 | | |
| KR | 1020140125352 A | 10/2014 | | |
| KR | 1020150020667 A | 2/2015 | | |
| KR | 102181313 B | 11/2016 | | |
| KR | 1020170102876 A | 9/2017 | | |
| KR | 101838337 B1 | 3/2018 | | |
| KR | 1020190102572 A | 9/2019 | | |
| KR | 1020200045790 A | 5/2020 | | |
| KR | 1020200081442 A | 7/2020 | | |
| KR | 102582604 B1 | 9/2023 | | |
| WO | 2019089482 A1 | 5/2019 | | |
| WO | 2019089492 A1 | 5/2019 | | |
| WO | WO 2019/208419 | * | 10/2019 | ............. H01M 4/62 |
| WO | 2020040031 A1 | 2/2020 | | |
| WO | WO 2020/142702 | * | 7/2020 | ............. H01M 2/16 |
| WO | 2020175079 A1 | 9/2020 | | |
| WO | 2020175292 A1 | 9/2020 | | |

OTHER PUBLICATIONS

Contemporary Amperex Technology Co., Limited, International Search Report and Written Opinion, PCT/CN2020/132954, May 27, 2021, 13 pgs.
The extended European search report received in the corresponding European application 20963114.2, mailed May 3, 2023.
Eunice K Wong et al: "Battery Separator Characterization and EvaluationProcedures for NASAs Advanced Lithium-Ion Batteries", May 1, 2010 (May 1, 2010).
Pannella F.et al: "A Survey of Methods for the Evaluation of TissueEngineering Scaffold Permeability" Annals of Biomedical Engineering vol. 41, No. 10, Apr. 24, 2013 (Apr. 24, 2013), pp. 2027-2041.
Nicolas Fedelich: "Application Handbook Thermal Analysis of PolymersSelected Applications Thermal Analysis", Jan. 1, 2013 (Jan. 1, 2013).
Notice of Reasons for Refusal received in the corresponding Japanese application 2022-550987, mailed Oct. 2, 2023.
Cancellation of utility model registration received in the corresponding Korean Patent No. 10-2536847, mailed Dec. 4, 2023.
Third Party Submission received in the corresponding European Application 20963111.8, mailed Feb. 8, 2024.
Cancellation of utility model registration received in the corresponding Korean Patent No. 10-2537203, mailed Nov. 23, 2023.
Third Party Submission received in the corresponding European Application 20963115.9, mailed Feb. 16, 2024.
Cancellation of utility model registration received in the corresponding Korean Patent No. 10-2582604, mailed Feb. 26, 2024.
The First Office Action received in the corresponding Chinese application 202080102823.9, issued on Jun. 7, 2024.
Notice of Preliminary Rejection received in the counterpart Korean application 10-2022-7028979, mailed on Jan. 8, 2025.

* cited by examiner

SEPARATOR, PREPARATION METHOD THEREFOR AND RELATED SECONDARY BATTERY, BATTERY MODULE, BATTERY PACK AND DEVICE

CROSS-REFERENCE TO RELATED APPLICATION

This application is a continuation application of PCT Patent Application No. PCT/CN2020/132954, entitled "SEPARATOR, PREPARATION METHOD THEREFOR, AND SECONDARY BATTERY, BATTERY MODULE, BATTERY PACK AND DEVICE RELATED THERETO" filed on Nov. 30, 2020, which is incorporated herein by reference in its entirety.

This application is related to U.S. patent application Ser. No. 17/942,031, entitled "SEPARATOR, PREPARATION METHOD THEREFOR, AND SECONDARY BATTERY, BATTERY MODULE, BATTERY PACK AND DEVICE" filed on Sep. 9, 2022, which is incorporated herein by reference in its entirety.

This application is related to U.S. patent application Ser. No. 17/942,029, entitled "SEPARATOR, SECONDARY BATTERY COMPRISING SAME AND RELATED BATTERY MODULE, BATTERY PACK AND DEVICE" filed on Sep. 9, 2022, which is incorporated herein by reference in its entirety.

This application is related to U.S. patent application Ser. No. 17/950,978, entitled "SEPARATOR, PREPARATION METHOD THEREFOR AND RELATED SECONDARY BATTERY, BATTERY MODULE, BATTERY PACK AND DEVICE" filed on Sep. 22, 2022, which is incorporated herein by reference in its entirety.

TECHNICAL FIELD

The present application belongs to the technical field of secondary batteries, and in particular relates to a separator, a preparation method therefor, and a related secondary battery, a battery module, a battery pack and a device.

BACKGROUND ART

Secondary batteries are widely used in various consumer electronic products and electric vehicles due to their outstanding features, such as a light weight, no pollution and no memory effect.

With the continuous development in the new energy industry, higher requirements for the use of secondary batteries have been proposed by costumers. For example, the energy density of secondary batteries is designed to be higher and higher; however, the increase of the energy density of the battery is often detrimental to balance electrochemical performance, or safety performance.

Therefore, it is a key challenge in the field of battery design to create batteries with both high cycling performance and high safety performance.

SUMMARY OF THE INVENTION

In view of the technical problems mentioned in the background art, the present application provides a separator, which aims to enable a secondary battery comprising the separator to have good cycling performance and safety performance.

In order to achieve the above object, in a first aspect, the present application provides a separator, comprising: a substrate and a coating formed on at least one surface of the substrate, wherein the coating comprises inorganic particles and organic particles, the organic particles comprise first organic particles and second organic particles both embedded in the inorganic particles and forming protrusions on the surface of the coating; the first organic particles have a number-average particle size of $\geq 8$ μm; the second organic particles have a number-average particle size of $\geq 2$ μm; and at least part of the second organic particles comprise a core structure and a shell structure.

Compared with the prior art, the present application comprises at least the following beneficial effects: the separator of the present application comprises inorganic particles, first organic particles and second organic particles in the same coating; moreover, the first organic particles and the second organic particles are specially designed in terms of the particle size and structure; with a combined result of the above conditions, the separator can be ensured to have a moderate and non-uniform pore structure, while improving the bonding force between the separator and the electrode plate; meanwhile, when the secondary battery is worked at a high temperature, the first and second organic particles will form a large-area adhesive film structure, so as to reduce or block the ion transmission channels and delay the thermal propagation of the battery, thereby effectively improving the cycling performance and safety performance at a high temperature of the battery.

In any embodiment of the present application, the first organic particles have a number-average particle size of $\geq 12$ μm; for example, the first organic particles can have a number-average particle size of 15 μm-25 μm. When the number-average particle size of the first organic particles is within the given range, the cycling performance of the battery can be further improved.

In any embodiment of the present application, the second organic particles have a number-average particle size of 3 μm-8 μm; for example, the second organic particles can have a number-average particle size of 3 μm-6 μm. When the number-average particle size of the second organic particles is within the given range, the cycling performance and safety performance of the battery can be further improved.

In any embodiment of the present application, the ratio of the number-average particle size of the first organic particles to that of the second organic particles is $\geq 2$; for example, the ratio of the number-average particle size of the first organic particles to that of the second organic particles is 2.5-4; When the ratio of the number-average particle size of the first organic particles to that of the second organic particles is within the given range, the cycling performance and safety performance of the battery can be further improved.

In any embodiment of the present application, the first organic particles are secondary particles. when the first organic particles are secondary particles, the safety performance of the battery can be further improved.

In any embodiment of the present application, the second organic particles are primary particles. When the second organic particles are primary particles, the cycling performance and safety performance of the battery can be further improved.

In any embodiment of the present application, the first organic particles can comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

In any embodiment of the present application, the first organic particles can comprise one or more of polytetrafluoroethylene, polychlorotrifluoroethylene, polyvinyl fluoride, polyvinylidene fluoride, polyethylene, polypropylene, poly acrylonitrile, polyethylene oxide, a copolymer of different fluorine-containing olefine monomeric units, a copolymer of a fluorine-containing olefine monomeric unit and an olefine monomeric unit, a copolymer of a fluorine-containing olefine monomeric unit and an acrylic monomeric unit, a copolymer of a fluorine-containing olefine monomeric unit and an acrylate monomeric unit, and modified compounds of these homopolymers or copolymers.

In any embodiment of the present application, the first organic particles can comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In any embodiment of the present application, the core structure and shell structure of the second organic particles can be each independently selected from one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In any embodiment of the present application, the core structure and shell structure of the second organic particles can be each independently selected from one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these copolymer.

In any embodiment of the present application, the core structure and shell structure of the second organic particles can be each independently selected from one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl acrylate-styrene copolymer, a butyl methacrylate-isooctyl methacrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the above materials.

In any embodiment of the present application, the core structure and the shell structure of the second organic particles can both comprise one or more of a copolymer of an acrylate monomeric unit and a styrene monomeric unit and modified compounds thereof.

By optimizing the material of the core structure and the shell structure of the second organic particles, the cycling performance of the battery can be further improved.

In any embodiment of the present application, the shell structure can have a glass transition temperature higher than that of the core structure. When the shell structure has a glass transition temperature higher than that of the core structure, the cycling performance of the battery can be further improved.

In any embodiment of the present application, the core structure has a glass transition temperature of $-30°$ C. to $20°$ C., for example, $-10°$ C. to $10°$ C.

In any embodiment of the present application, the shell structure has a glass transition temperature of $50°$ C. to $70°$ C., for example, $55°$ C. to $65°$ C.

In any embodiment of the present application, the inorganic particles comprise one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

In any embodiment of the present application, the mass percentage of the inorganic particles in the coating is $\leq 70\%$, for example, the mass percentage of the inorganic particles in the coating is 60%-70%. When the mass percentage of the inorganic particles is controlled within the given range, the mass energy density of the battery can be further improved while ensuring the safety performance of the separator.

In any embodiment of the present application, the mass percentage of the first organic particles in the coating is $\geq 12\%$; for example, the mass percentage of the first organic particles in the coating is 15%-25%. When the mass percentage of the first organic particles is controlled within the given range, the cycling performance and safety performance of the battery can be improved.

In any embodiment of the present application, the mass percentage of the second organic particles in the coating is $\leq 10\%$; for example, the mass percentage of the second organic particles in the coating is 2%-10%. When the mass percentage of the second organic particles is controlled within the given range, the cycling performance and safety performance of the battery can be improved.

When the inorganic particles, the first organic particles or the second organic particles are within the above range, these three particles can have a better synergistic effect, thereby further improving the the cycling performance and energy density of the battery.

In any embodiment of the present application, the separator has a single-sided coating weight per unit area of $\leq 3.0$ g/m$^2$; the separator has a single-sided coating weight per unit area of 1.5 g/m$^2$-2.5 g/m$^2$. When the weight of single-sided coating on the separator per unit area is within the given range, the energy density of the battery can be further improved while ensuring the cycling performance and safety performance of the battery.

In any embodiment of the present application, the separator can have an air permeability of 100 s/100 mL-300 s/100 mL; for example, the separator can have an air permeability of 150 s/100 mL-250 s/100 mL.

In any embodiment of the present application, the separator can have a transverse tensile strength (Machine Direction, MD) of 1500 kgf/cm$^2$-3000 kgf/cm$^2$; for example, the separator can have a transverse tensile strength of 1800 kgf/cm$^2$-2500 kgf/cm$^2$.

In any embodiment of the present application, the separator can have a longitudinal tensile strength (Transverse Direction, TD) of 1000 kgf/cm$^2$-2500 kgf/cm$^2$; for example, the separator can have a longitudinal tensile strength of 1400 kgf/cm$^2$-2000 kgf/cm$^2$.

In any embodiment of the present application, the separator can have a transverse elongation at break of 50%-200%; for example, the separator can have a transverse elongation at break of 100%-150%.

In any embodiment of the present application, the separator can have a longitudinal elongation at break of 50%-200%; for example, the separator can have a longitudinal elongation at break of 100%-150%.

In any embodiment of the present application, the inorganic particles and the organic particles form a non-uniform pore structure in the coating.

In any embodiment of the present application, the spacing between any two adjacent inorganic particles is denoted as L1, and the spacing between any inorganic particle and an adjacent organic particle is denoted as L2, wherein L1<L2.

In a second aspect, the present application provides a method for preparing a separator, comprising the steps of:
(1) providing a substrate;
(2) providing a coating slurry, comprising a component material and a solvent, wherein the component material comprises inorganic particles and organic particles, and the organic particles comprise first organic particles and second organic particles; and
(3) coating at least one side of the substrate from step (1) with the coating slurry from step (2), so as to form a coating, and drying same to obtain the separator; wherein the dried coating comprises the inorganic particles, the first organic particles and the second organic particles; the first organic particles and the second organic particles are embedded in the inorganic particles and form protrusions on the surface of the dried coating. The first organic particles have a number-average particle size of ≥8 μm; the second organic particles have a number-average particle size of ≥2 μm; and at least part of the second organic particles comprise a core structure and a shell structure.

In any embodiment of the present application, in step (2), the first organic particles are added in a mass percentage of 12% or more of the total dry weight of the component material; in some embodiments 12%-30%.

In any embodiment of the present application, in step (2), the second organic particles are added in a mass percentage of 10% or less of the total dry weight of the component material, in some embodiments 2%-10%.

In any embodiment of the present application, in step (2), the coating slurry has a solid content of 28%-45%, in some embodiments 30%-38%, by weight.

In any embodiment of the present application, in step (3), the coating is carried out by using a coating machine, wherein the coating machine comprises a gravure roller which has a number of lines of 100 LPI-300 LPI, in some embodiments 125 LPI-190 LPI.

In any embodiment of the present application, in step (3), the coating is carried out at a speed of 30 m/min-90 m/min, in some embodiments 50 m/min-70 m/min.

In any embodiment of the present application, in step (3), the coating is carried out at a line speed ratio of 0.8-2.5, in some embodiments 0.8-1.5.

In any embodiment of the present application, in step (3), the drying is carried out at a temperature of 40° C. to 70° C., in some embodiments 50° C. to 60° C.

In any embodiment of the present application, in step (3), the drying is carried out for a period of 10 s-120 s, in some embodiments 20 s-80 s.

In a third aspect, the present application provides a secondary battery, comprising a separator according to the first aspect of the present application or a separator prepared by the method according to the second aspect of the present application.

In a fourth aspect, the present application provides a battery module, comprising a secondary battery according to the third aspect of the present application.

In a fifth aspect, the present application provides a battery pack, comprising a battery module according to the fourth aspect of the present application.

In a sixth aspect, the present application provides a device, comprising at least one of a secondary battery according to the third aspect of the present application, a battery module according to the fourth aspect of the present application, or a battery pack according to the fifth aspect of the present application.

Since the device of the present application comprises at least one of a secondary battery, a battery module or battery pack provided by the present application, and thus has at least the same advantages as the secondary battery.

BRIEF DESCRIPTION OF THE DRAWINGS

In order to illustrate the technical solutions of the present application more clearly, the drawings used in the present application will be described briefly below. Apparently, the drawings described below are merely some embodiments of the present application, and those person skilled in the art may derive other drawings from these drawings without creative efforts.

FIG. 5-1 is a structural schematic diagram of an embodiment of a separator of the present application.

FIG. 5-2 is a structural schematic diagram of a further embodiment of a separator of the present application.

DETAILED DESCRIPTION OF EMBODIMENTS

Figure 1:
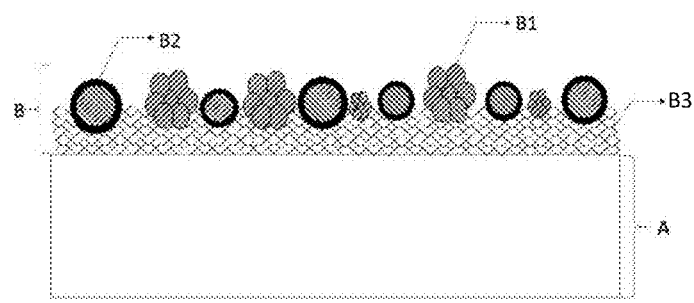
FIG. 1 is a structural schematic diagram of an embodiment of a separator of the present application.

The present application will be further described below in conjunction with specific embodiments. It should be understood that these specific embodiments are merely intended to illustrate the present application but not to limit the scope of the present application.

For the sake of brevity, only certain numerical ranges are specifically disclosed herein. However, any lower limit may be combined with any upper limit to form form a range that is not explicitly described; and any lower limit may be combined with any other lower limit to form an unspecified range, and any upper limit likewise may be combined with any other upper limit to form an unspecified range. Furthermore, each individually disclosed point or single value itself may serve as a lower or upper limit in combination with any other point or single value or with other lower or upper limit to form an unspecified range.

In the description herein, unless otherwise stated, the term "or" is inclusive. That is to say, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

In the description herein, it should be noted that, unless otherwise stated, the recitation of numerical ranges by "no less than" and "no more than" include all numbers within that range including the endpoints, the recitation of "more" in the phrase "one or more" comprises two or more.

Unless otherwise stated, the terms used in the present application have the meaning well-known to those of ordinary skill in the art. Unless otherwise stated, the values of the parameters mentioned in the present application may be measured by various measurement methods commonly used in the art (for example, may be measured according to the method illustrated in the examples of the present application).

[Secondary Battery]

A secondary battery, refers to a battery which can continue to be used by activating the active material by means of charging after the battery is discharged.

Generally, the secondary battery comprises a positive electrode plate, a negative electrode plate, a separator and an electrolyte. During the charging/discharging process of the battery, active ions are intercalated and de-intercalated back and forth between the positive electrode plate and the negative electrode plate. The separator is provided between the positive electrode plate and the negative electrode plate, and functions for separation. The electrolyte is between the positive electrode plate and the negative electrode plate and functions for ionic conduction function.

[Separator]

In an embodiment, the present application provides a separator, comprising: a substrate and a coating formed on at least one surface of the substrate, wherein the coating comprises inorganic particles and organic particles, the organic particles comprise first organic particles and second organic particles both embedded in the inorganic particles and forming protrusions on the surface of the coating. The first organic particles have a number-average particle size of ≥8 μm. The second organic particles have a number-average particle size of ≥2 μm, and at least part of the second organic particles comprise a core structure and a shell structure.

It should be noted that the number-average particle size of the organic particles refers to the arithmetic mean of the particle size of the organic particles counted according to the number of the organic particles in the coating of the separator. The particle size of the organic particle refers to the distance between two points on the organic particles that are farthest apart.

Without wishing to be bound by any theory, it is found through a lot of studies by the inventors that the separator comprises inorganic particles and organic particles in the same coating, which can greatly reduce the overall thickness of the separator, compared to a separator comprising two coatings, i.e., an inorganic particles layer and an organic particles layer, thus improving the energy density of the battery; moreover, by comprising the first organic particles and the second organic particles with a specific number-average particle size and structural design in the organic particles, the bonding between the separator and the electrode plate can be effectively improved; meanwhile, the probability of forming a large-area adhesive film structure by swelling of the second organic particles in the electrolyte during the normal temperature operation can be effectively reduced, such that the separator has a moderate and non-uniform pore structure, facilitating the ion transmission; furthermore, the presence of the first organic particles allows a suitable stress release space between the separator and the electrode plate during the battery cycling process, which is beneficial to the gas discharge during the battery formation process, thereby effectively improving the cycling performance and safety performance of the battery.

By the intensive study, the inventors have found that on the basis that the separator of the present application satisfies the above conditions, if one or more of the following conditions are also optionally satisfied, the performance of the secondary battery can be further improved.

In some embodiments, the first organic particles have a number-average particle size of ≥12 μm; the first organic particles have a number-average particle size of 15 μm-25 μm. For example, the first organic particles can have a number-average particle size of 12 μm-23 μm, 13 μm-22 μm, 15 μm-20 μm and 12 μm-18 μm. When the number-average particle size of the first organic particles is within the given range, the organic particles are enabled to have sufficient voids therebetween; even though the organic particles swell in the electrolyte, sufficient ion transmission channels can be formed, thereby further improving the cycling performance of the battery.

In some embodiments, the second organic particles have a number-average particle size of 3 μm-8 μm; for example, the second organic particles can have a number-average particle size of 3 μm-6 μm, 3 μm-5.5 μm, and 4 μm-5 μm. When the number-average particle size of the second organic particles is within the given range, the cycling performance of the battery can be further improved. If the number-average particle size of the second organic particles is too small (for example, less than 2 μm), the particles will easily swell in the electrolyte to form an adhesive film structure, which will block the ion transmission channels during the normal operation of the battery, thereby affecting the cycling performance of the battery.

In some embodiments, the ratio of the number-average particle size of the first organic particles to that of the second organic particles is ≥2; for example, the ratio of the number-average particle size of the first organic particles to that of the second organic particles can be 2.5-4, 3-4.5 and 3-4. The selection of the ratio of the number-average particle size of the first organic particles to that of the second organic particles can further improve the cycling performance and safety performance of the battery.

In some embodiments, the first organic particles are secondary particles. When the coating of the separator comprises the first organic particles with a secondary particle morphology, it is helpful to form an uniform coating interface, and when the separator is used in a battery, the tabs dislocation problem during the preparation of the battery can be effectively improved, thereby further improving the safety performance of the battery.

In some embodiments, the second organic particles are primary particles. When the coating of the separator comprises the second organic particles with a primary particle morphology, a large-area adhesive film structure does easily form between the particles, and thus the cycling performance and safety performance of the battery can be further improved.

It should be noted that the primary particles and secondary particles have meanings well-known in the art. A primary particle refers to a particle that does not form an agglomerated state. A secondary particle refers to a particle in an agglomerated state formed by the aggregation of two or more primary particles.

As shown in FIG. 1, the separator comprises a substrate (A) and a coating (B), wherein the coating (B) comprises first organic particles (B1), second organic particles (B2) and inorganic particles (B3), the first organic particles (B1) are secondary particles, the second organic particles (B2) are primary particles, the first organic particles and second organic particles are both embedded in the inorganic particles (B3) and form protrusions on the surface of the coating, and the second organic particles (B2) comprise a core structure and a shell structure provided on the surface of the core structure.

In some embodiments, the first organic particles cam comprise one or more of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and modified compounds of these homopolymers or copolymers.

In some embodiments, the fluorine-containing olefine monomeric unit can be selected from one or more of difluoroethylene, vinylidene fluoride, trifluoroethylene, chlorotrifluoroethylene, tetrafluoroethylene, and hexafluoropropylene.

In some embodiments, the olefine monomeric unit can be selected from one or more of ethylene, propylene, butadiene, and isoprene.

In some embodiments, the unsaturated nitrile monomeric unit can be selected from one or more of acrylonitrile, and methylacrylonitrile.

In some embodiments, the alkylene oxide monomeric unit can be selected from one or more of ethylene oxide, and propylene oxide.

In some embodiments, the first organic particles can comprise one or more of polytetrafluoroethylene, polychlorotrifluoroethylene, polyvinyl fluoride, polyvinylidene fluoride, polyethylene, polypropylene, polyacrylonitrile, polyethylene oxide, a copolymer of different fluorine-containing olefine monomeric units, a copolymer of a fluorine-containing olefine monomeric unit and an olefine monomeric unit, a copolymer of a fluorine-containing olefine monomeric unit and an acrylic monomeric unit, a copolymer of a fluorine-containing olefine monomeric unit and an acrylate monomeric unit, and modified compounds of these homopolymers or copolymers.

In some embodiments, the first organic particles can comprise one or more of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and modified compounds of these copolymers.

In some embodiments, the core structure and shell structure of the second organic particles can be each independently selected from one or more of a homopolymer or copolymer of an acrylate monomeric unit, a homopolymer or copolymer of an acrylic monomeric unit, a homopolymer or copolymer of a styrene monomeric unit, a polyurethane compound, a rubber compound, and modified compounds of these homopolymers or copolymers.

In some embodiments, the core structure and shell structure of the second organic particles can be each independently selected from one or more of a copolymer of an acrylate monomeric unit and a styrene monomeric unit, a copolymer of an acrylic monomeric unit and a styrene monomeric unit, a copolymer of an acrylic monomeric unit, an acrylate monomeric unit and a styrene monomeric unit, a copolymer of a styrene monomeric unit and an unsaturated nitrile monomeric unit, a copolymer of a styrene monomeric unit, an olefine monomeric unit and an unsaturated nitrile monomeric unit, and modified compounds of these copolymer.

In some embodiments, the acrylate monomeric unit can be selected from one or more of methyl acrylate, ethyl acrylate, propyl acrylate, butyl acrylate, methyl methacrylate, butyl methacrylate, and isooctyl methacrylate.

In some embodiments, the acrylic monomeric unit can be selected from one or more of acrylic acid, and methacrylic acid.

In some embodiments, the styrene monomeric unit can be selected from one or more of styrene, and methylstyrene.

In some embodiments, the unsaturated nitrile monomeric unit can be selected from one or more of acrylonitrile, and methylacrylonitrile.

In some embodiments, the core structure and shell structure of the second organic particles can be each independently selected from one or more of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl acrylate-styrene copolymer, a butyl methacrylate-isooctyl methacrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, a styrene-vinyl acetate copolymer, a styrene-vinyl acetate-pyrrolidone copolymer, and modified compounds of the these materials.

In some embodiments, the core structure and the shell structure of the second organic particles can both comprise one or more of a copolymer of an acrylate monomeric unit and a styrene monomeric unit and modified compounds thereof.

A modified compound of the homopolymer or copolymer refers to a modified compound obtained by copolymerization of the monomeric units in the homopolymer or copolymer with monomeric units containing a specific functional group. For example, a fluorine-containing olefine monomeric unit can be copolymerized with a carboxyl functional group-containing compound to obtain a modified compound thereof.

In some embodiments, the core structure and the shell structure comprise the same copolymer of a monomeric unit. The glass transition temperatures of the materials of the core structure and shell structure can be adjusted by adjusting the copolymerization ratio of the monomeric units or the polymerization process by a method known to those of ordinary skill in the art.

In some embodiments, the shell structure has a glass transition temperature higher than that of the core structure. Since the shell structure has a higher glass transition temperature, the probability of fusion between organic particles to form a continuous adhesive film during the production process of the separator can be effectively reduced, thus improving the ion transmission channel of the separator; in addition, a good ability of bonding the electrode plates in the electrolyte can be maintained, such that the electrode plates are better adhered onto the separator. Thus, this will facilitating a further improvement of the cycling performance of the battery.

In some embodiments, the core structure can have a glass transition temperature of −30° C. to 20° C.; for example, −10° C. to 10° C.

In some embodiments, the shell structure can have a glass transition temperature of 50° C. to 70° C.; for example, 55° C. to 65° C.

In some embodiments, the core structure and the shell structure both comprise a copolymer of an acrylate monomeric unit, which is helpful to reduce the swelling ratio of the second organic particles in the electrolyte during the normal temperature operation, and further avoid the formation of a large-area adhesive film structure, thereby facilitating to further improve the cycling performance of the battery.

In some embodiments, the core structure and the shell structure both comprise a copolymer of an acrylic monomeric unit and a styrene monomeric unit.

In some embodiments, the inorganic particles can comprise one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); for example, the inorganic particles can comprise one or more of boehmite (γ-AlOOH), and aluminum oxide ($Al_2O_3$).

In some embodiments, the inorganic particles have a volume-average particle size Dv50 of ≤2.5 μm; for example, the inorganic particles can have a volume-average particle size Dv50 of 0.5 μm-2.5 μm, 1.5 μm-2.5 μm and 0.3 μm-0.7 μm. When the particle size of the inorganic particles is controlled within the given range, the volume energy density of the battery can be further improved while ensuring the better cycling performance and safety performance of the separator.

In some embodiments, the mass percentage of the inorganic particles in the coating is ≤70% (based on the total mass of the coating); for example, the mass percentage of the inorganic particles in the coating can be 60%-70% and 65%-70%. When the mass percentage of the inorganic particles is controlled within the given range, the mass energy density of the battery can be further improved while ensuring the safety performance of the separator.

In some embodiments, the mass percentage of the first organic particles in the coating is ≥12% (based on the total mass of the coating); for example, the mass percentage of the first organic particles in the coating can be 12%-30%, 15%-30%, 15%-25%, and 15%-20%. When the mass percentage of the first organic particles is controlled within the given range, there can be a sufficient stress release space between the separator and the electrode plate during the battery cycling, which further improves the interface of the electrode plate; furthermore, a suitable mass percentage range also can reduce the consumption of the electrolyte by the separator, thereby further improving the cycling performance and safety performance of the battery.

In some embodiments, the mass percentage of the second organic particles in the coating is ≤10% (based on the total mass of the coating); for example, the mass percentage of the second organic particles in the coating can be 2%-10%, 3%-8%, 4%-9%, and 5%-10%. When the mass percentage of the second organic particles is controlled within the given range, it is helpful for the coating of the separator to have a suitable pore structure while ensuring the bonding, thereby further improving the cycling performance and safety performance of the battery.

By selecting suitable contents of the inorganic particle, the first organic particles and the second organic particles, a better synergistic effect of the three types of particles can be achieved, ensuring that the separator further has a suitable pore structure while ensuring the safety performance thereof, and at the same time achieves a light-weight separator, thereby further improving the energy density of the battery.

In some embodiments, the separator has a single-sided coating weight per unit area of ≤3.0 $g/m^2$; for example, the separator can have a single-sided coating weight per unit area of 1.5 $g/m^2$-3.0 $g/m^2$, 1.5 $g/m^2$-2.5 $g/m^2$ and 1.8 $g/m^2$-2.3 $g/m^2$. When the weight of single-sided coating on the separator per unit area is controlled within the given range, the energy density of the battery can be further improved while ensuring the cycling performance and safety performance of the battery.

According to some embodiments, the coating can further comprise other organic compounds, for example, a polymer that improve the heat resistance, a dispersant, a wetting agent, other types of bonders, etc. The above other organic compounds are all non-granular substances in the coating. In the present application, the above other organic compounds are not particularly limited, and can be selected from any well-known materials with well improved performance.

In an embodiment of the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, the substrate has a thickness ≤10 μm; for example, the substrate can have a thickness of 5 μm-10 μm, 5 μm-9 μm and 7 μm-10 μm. When the thickness of the substrate is controlled within the given range, the energy density of the battery can be further improved while ensuring the cycling performance and safety performance of the battery.

In some embodiments, the separator can have an air permeability of 100 s/100 mL-300 s/100 mL; for example, the separator can have an air permeability of 150 s/100 mL-250 s/100 mL and 170 s/100 mL-220 s/100 mL.

In some embodiments, the separator can have a transverse tensile strength (MD) of 1500 $kgf/cm^2$-3000 $kgf/cm^2$; for example, the separator can have a transverse tensile strength of 1800 $kgf/cm^2$-2500 $kgf/cm^2$.

In some embodiments, the separator can have a longitudinal tensile strength (TD) of 1000 $kgf/cm^2$-2500 $kgf/cm^2$; for example, 1400 $kgf/cm^2$-2000 $kgf/cm^2$.

In some embodiments, the separator can have a transverse elongation at break of 50%-200%; for example, the separator can have a transverse elongation at break of 100%-150%.

In some embodiments, the separator can have a longitudinal elongation at break of 50%-200%; for example, the separator can have a longitudinal elongation at break of 100%-150%.

In some embodiments, the spacing between any two adjacent inorganic particles is denoted as L1, and the spacing between any inorganic particle and an adjacent organic particle is denoted as L2, wherein L1<L2.

According to some embodiments, the particle size and number-average particle size of the organic particles can be measured by an apparatus and method known in the art. For example, a scanning electron microscope (for example, ZEISS Sigma 300) is used to obtain a scanning electron microscope (SEM) picture of the separator, for example, by referring to JY/T010-1996. As an example, the measurement can be carried out as follows: a test sample with length×width=50 mm×100 mm is randomly selected from the separator and a plurality of (for example, 5) test areas are randomly selected on the test sample; at a certain magnification (for example, 500× when measuring the first organic particles and 1000× when measuring the second organic particles), the particle sizes (the distance between two points that are farthest apart is taken as the particle size of the organic particle) of the respective organic particles in the respective test areas are read. The numbers and particle size values of the organic particles in the respective test areas are recorded, and an arithmetic mean of the particle sizes of the organic particles in the test areas are taken as the number-average particle size of the organic particles in the test sample. In order to ensure the accuracy of the test results, the above measurement can be carried out on a plurality of (for example, 10) test samples, and an average of these test samples is taken as the final measurement result.

According to some embodiments, the particle structure (comprising a core structure and a shell structure) of the second organic particles can be determined by an apparatus and method known in the art. As an example, the operation can be carried out by the steps of: a microgrid with a diameter (for example a diameter of 3 mm) is selected, with a film surface (the film surface is a surface having a gloss when observed under the light) of the microgrid facing up, and gently laid flat on a white filter paper; an appropriate amount of a second organic particle slurry sample (such as 10 g) is added into a beaker and ultrasonically vibrated for 10-30 min; the slurry is taken with a glass capillary; then 2-3 drops of the sample to be tested are added dropwise on the microgrid, and left to stand for 15 min; then, the microgrid with the sample to be tested is placed onto a sample stage, and tested with a transmission electron microscope (such as Hitachi HF-3300S Cs-corrected STEM), to obtain the transmission electron microscope (TEM) picture of the sample to be tested.

Figure 2:
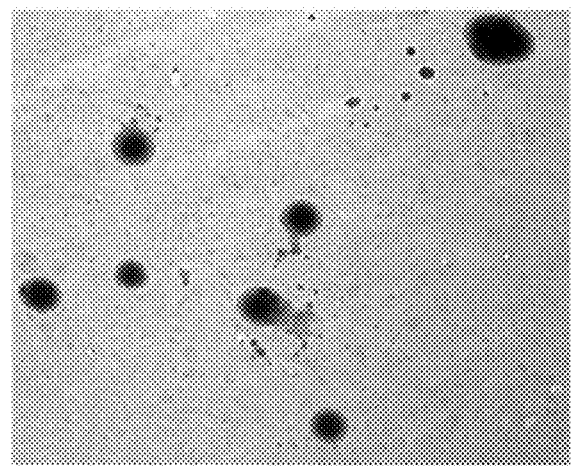
FIG. 2 is a transmission electron microscope (TEM) picture of the second organic particles used in a separator of the present application.

FIG. 2 is a transmission electron microscope (TEM) picture of the second organic particles in an embodiment of the present application. As shown in FIG. 2, the second organic particles comprise a core structure and a shell structure provided on the surface of the core structure.

According to some embodiments, the morphology of the organic particles (for example: primary particle morphology or secondary particle morphology) can be determined by an apparatus and method known in the art. For example, a scanning electron microscope (for example, ZEISS Sigma 300) can be used for the determination. As an example, the following steps are performed: first, a separator is cut into a sample to be tested with a certain size (for example, 6 mm×6 mm), and the sample to be tested is sandwiched by two electrically and thermally conductive sheets (for example, copper foils), and the sample to be tested is sticked and fixed to the sheets by an adhesive (for example, a double-sided adhesive tape), and pressed with a flat iron block having a mass (for example, about 400 g) for a period of time (for example, 1 h), such that the gaps between the sample to be tested and the copper foils are as small as possible, the edges are then trimmed using scissors; the sample to be tested is sticked onto a sample stage with a conductive adhesive, with the sample slightly protruding from the edge of the sample stage. Then, the sample stage is mounted onto a sample holder and locked for fixation; the power of an argon ion cross section polisher (for example, IB-19500CP) is turned on for vacuumization (for example, 10 Pa-4 Pa); the argon flow rate (for example, 0.15 MPa) and voltage (for example, 8 KV) and polishing time (for example, 2 hours) are set, the sample stage is adjusted to a rocking mode to start the polishing; after the completion of the polishing, the ion-polished cross-sectional topography (CP) picture of the test sample is obtained by using a scanning electron microscope (for example, ZEISS Sigma 300).

Figure 3:
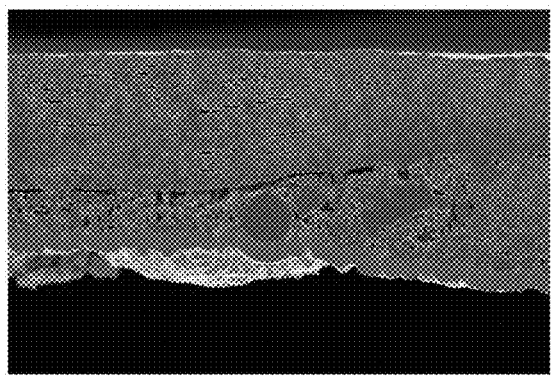
FIG. 3 is an ion-polished cross-sectional topography (cross-section polishing, CP) picture at a 3000× magnification in an embodiment of a separator of the present application.

FIG. 3 is an ion-polished cross-sectional topography (CP) picture at a 3000× magnification of a separator in an embodiment of the present application. It can be seen from FIG. 3 that the coating of the separator comprises the first organic particles and the second organic particles; the first organic particles are secondary particles composed of a plurality of primary particles and have an irregular non-solid spherical cross-section; and the second organic particles are non-agglomerated primary particles and have a solid spherical cross-section.

According to some embodiments, the spacing between any two adjacent inorganic particles is determined by randomly selecting two inorganic particles in the coating (when the inorganic particles are of an irregular shape, the particles can be circumscribed to form a circle) in the SEM image of the separator, and measuring the spacing between the centers of circles of the two inorganic particles as the spacing between the two inorganic particles, denoted as L1.

According to some embodiments, the spacing between any inorganic particle and an adjacent organic particle is determined by randomly selecting an inorganic particle and an organic particle in the coating (when the inorganic particle or organic particle are of an irregular shape, the particle can be circumscribed to form a circle) in the SEM image of the separator, and measuring the spacing between the centers of circles of the inorganic particle and the organic particle as the spacing between the inorganic particle and the organic particle, denoted as L2. The mentioned organic particle may be a first organic particle, or a second organic particle.

The spacing can be determined using an instrument known in the art. For example, it can be determined by a scanning electron microscope. As an example, the spacing L2 between any inorganic particle and an adjacent organic particle can be measured as follows: a separator is made into a test sample with length×width=50 mm×100 mm; the separator is measured using a scanning electron microscope (for example, ZEISS Sigma300). The measurement can be carried out by referring to JY/T010-1996. An area is randomly selected in the test sample for scanning, to obtain an SEM image of the separator under a certain magnification (for example, 3000×); in the SEM image, an inorganic particle and an adjacent organic particle are randomly selected (when the inorganic particle or organic particle is an irregular body, the particle can be circumscribed to form a circle), to measure the distance between the centers of circles of the inorganic particle (or the circumscribed circle thereof) and the organic particle (or the circumscribed circle thereof), as the spacing between the inorganic particle and adjacent organic particle of the present application, denoted as L2. In order to ensure the accuracy of the measurement results, a number of groups of adjacent particles (for example, 10 groups) can be selected in the test sample to repeat the measurement, and an average of the test results on the groups are taken as the final result.

Similarly, the spacing between any two adjacent inorganic particles L1 can also be measured according to the above method.

Figure 4:
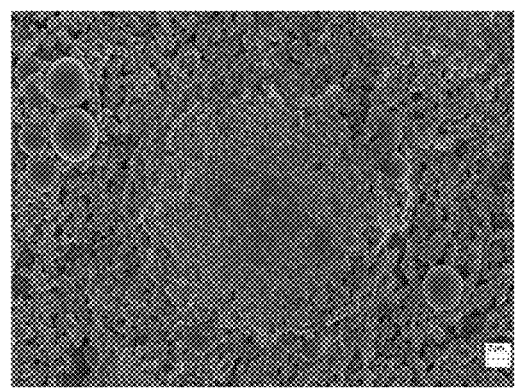
FIG. 4 is a scanning electron microscope (SEM) picture at a 3000× magnification of an embodiment of a separator of the present application.

FIG. 4 is a scanning electron microscope (SEM) picture at a 3000× magnification of a separator in an embodiment of the present application. It can be seen from FIG. 4 that the coating of the separator comprises inorganic particles, first organic particles and second organic particles, wherein the first organic particles are secondary particles, the second organic particles are primary particles, and the first organic particles and second organic particles are embedded in the inorganic particles and form protrusions on the surface of the coating. By the measurement according to the method described above, it can be derived that L1<L2.

According to some embodiments, the material type of the organic particles can be determined by an apparatus and method known in the art. For example, the infrared spectrum of the material can be measured, so as to determine the characteristic peaks contained therein, and thus to determine the material type. Specifically, the organic particles can be analyzed by infrared spectroscopy using instruments and methods known in the art, for example an infrared spectrometer, for example, be determined by an IS10 Fourier transform infrared spectrometer from Nicolet, USA, and according to the GB/T6040-2002 General rules for infrared spectrum analysis.

According to some embodiments, the volume-average particle size Dv50 of the inorganic particles has the meaning well-known in the art, and can be determined by an instrument and method known in the art. For example, it can be determined by referring to GB/T 19077-2016 particle size distribution-laser diffraction method, using a laser particle size analyzer (for example, Master Size 3000).

According to some embodiments, the air permeability, transverse tensile strength (MD), longitudinal tensile strength (TD), transverse elongation at break, and longitudinal elongation at break of the separator all have meanings well-known in the art, and can be determined according to the methods known in the art. For example, they can all be determined by referring to GB/T 36363-2018.

The present application also provides a method for preparing the separator, comprising the steps of:
(1) providing a substrate;
(2) providing a coating slurry: the coating slurry comprising a component material and a solvent, wherein the component material comprises inorganic particles and organic particles, and the organic particles comprise first organic particles and second organic particles; and
(3) coating at least one side of the substrate from step (1) with the coating slurry from step (2) so as to form a coating, and drying same to obtain the separator; wherein the dried coating comprises inorganic particles, first organic particles and second organic particles which first organic particles and the second organic particles are both embedded in the inorganic particles and form protrusions on the surface of the dried coating; the first organic particles have a number-average particle size of ≥8 μm; the second organic particles have a number-average particle size of ≥2 μm, and at least part of the second organic particles comprise a core structure and a shell structure.

Figures 1, 5:
Figures 2, 5:
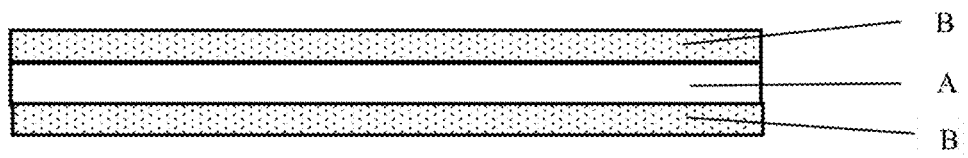

As shown in FIG. 5-1, the separator (10) comprises a substrate (A) and a coating (B), and the coating (B) is disposed on only one surface of the substrate (A).

As shown in FIG. 5-2, the separator (10) comprises a substrate (A) and a coating (B), and the coating (B) is disposed on both surfaces of the substrate (A) at the same time.

In an embodiment of the present application, the material of the substrate is not particularly limited, and can be selected from any well-known substrate with good chemical and mechanical stability, for example one or more of glass fibers, a non-woven fabric, polyethylene, polypropylene, and polyvinylidene fluoride. The substrate can be a single-layer film, or a multi-layer composite film. When the substrate is a multi-layer composite film, the materials of the respective layers may be the same or different.

In some embodiments, in step (2), the solvent can be water, for example, deionized water.

In some embodiments, in step (2), the component material also can comprise other organic compounds, for example, a polymer that improves the heat resistance, a dispersant, a wetting agent, an emulsion bonder. In such a case, the other organic compounds are all non-granular in the dried coating.

In some embodiments, in step (2), a component material is added to the solvent and stirred uniformly to obtain a coating slurry.

In some embodiments, in step (2), the first organic particles are added in a mass percentage of 12% or more of the total dry weight of the component material; for example, 12%-30%, 15%-30%, 15%-25%, 15%-20% and 16%-22%.

In some embodiments, in step (2), the second organic particles are added in a mass percentage of 10% or less of the total dry weight of the component material, for example, 2%-10%, 3%-7% and 3%-5%.

An appropriate content of the organic particles can reduce the static electricity generated between the separator and a battery winding tool (such as, a rolling pin) or laminating tool during the preparation of the battery, and effectively reduce the probability of short circuit between the positive electrode and negative electrode, thereby improving the manufacturing yield of the battery.

It should be noted that when the component material is in a solid state, the dry weight of the component material is the mass of the component material that is added. When the component material is in a suspension, an emulsion or a solution, the dry weight of the component material is a product of the mass of the component material that is added and the solid content of the component material. The total dry weight of the component material ingredients is the sum of the dry weights of the component material ingredients.

In some embodiments, in step (2), the solid content of the coating slurry can be controlled at 28%-45%, for example, 30%-38%, by weight. When the solid content of the coating slurry is within the above range, the film surface problem of the coating can be effectively reduced and the probability of non-uniform coating can be reduced, thereby further improving the cycling performance and safety performance of the battery.

In some embodiments, in step (3), the coating is carried out by a coating machine.

In an embodiment of the present application, the model of the coating machine is not particularly limited, and a commercially available coating machine can be used.

In some embodiments, in step (3), the coating can be carried out by a process, such as transfer coating, rotary spraying, dip coating, etc.; for example, the coating is carried out by transfer coating.

In some embodiments, the coating machine comprises a gravure roll; and the gravure roller is used for transferring the coating slurry to the substrate.

In some embodiments, the gravure roller can have a number of lines of 100 LPI-300 LPI, for example, 125 LPI-190 LPI (LPI represents lines/inch). When the number of lines of the gravure roller is within the above range, it is helpful to control the number of the first organic particles and the second organic particles, thereby further improving the cycling performance and safety of the separator.

In some embodiments, in step (3), the speed for coating can be controlled at 30 m/min-90 m/min, for example, 50 m/min-70 m/min. When the speed for the coating is within the above range, the film surface problem of the coating can be effectively reduced, and the probability of non-uniform coating can be reduced, thereby further improving the cycling performance and safety performance of the battery.

In some embodiments, in step (3), the line speed ratio for coating can be controlled at 0.8-2.5, for example, 0.8-1.5, and 1.0-1.5.

In some embodiments, in step (3), the drying can be carried out at a temperature of 40° C. to 70° C., for example, 50° C. to 60° C.

In some embodiments, in step (3), the drying can be carried out for a period of 10 s-120 s, for example, 20 s-80 s, and 20 s-40 s.

By controlling the above process parameters within the given ranges, the operational performance of the separator in the present application can be further improved. those of ordinary skill in the art can selectively adjust and control one or more of the above process parameters according to the actual production.

In order to further improve the performance of the secondary battery, the inorganic particles and the organic particles also satisfy one or more of the aforementioned parameter conditions. It will not be repeated here.

The above substrate, first organic particles and second organic particles are all commercially available.

In the method for preparing a separator in an embodiment of the present application, the coating is prepared by one-time coating, which greatly simplifies the production process of the separator; meanwhile, the use of the separator prepared by the above method in a battery can effectively improve the cycling performance and safety performance of the battery.

[Positive Electrode Plate]

In a secondary battery, a positive electrode plate generally comprises a positive electrode current collector and a positive electrode film layer provided on the positive electrode current collector, wherein the positive electrode film layer comprises a positive electrode active material.

The positive electrode current collector may be a conventional metal foil or a composite current collector (for example, a composite current collector can be formed by providing a metal material on a polymer substrate). As an example, the positive electrode current collector may be an aluminum foil.

The specific types of the positive electrode active materials are not limited, and active materials known in the art that can be used for the positive electrode of secondary batteries can be used, and the active materials can be selected by those of ordinary skill in the art according to actual requirements.

As an example, the positive electrode active material can include, but is not limited to, one or more of lithium transition metal oxides, lithium-containing phosphates with a olivine structure and the respective modified compounds thereof. An example of the lithium transition metal oxide can include, but is not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and the respective modified compounds thereof. An example of the lithium-containing phosphates with a olivine structure can include, but is not limited to, one or more of lithium iron phosphate, a lithium iron phosphate-carbon composite, lithium manganese phosphate, a lithium manganese phosphate-carbon composite, lithium iron manganese phosphate, a lithium iron manganese phosphate-carbon composite and modified compounds thereof. These materials are all commercially available.

The modified compounds of these materials can be from the doping modification and/or surface coating modification of the materials.

The positive electrode film layer typically also comprises a bonder, a conductive agent and other optional auxiliary agents.

As an example, the conductive agent can be one or more of superconducting carbon, acetylene black, carbon black, Ketjen black, carbon dots, carbon nanotubes, Super P (SP), graphene and carbon nanofibers.

As an example, the bonder can be one or more of a styrene-butadiene rubber (SBR), a water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA) and polyvinyl butyral (PVB).

[Negative Electrode Plate]

In a secondary battery, a negative electrode plate generally comprises a negative electrode current collector and a negative electrode film layer provided on the negative electrode current collector, wherein the negative electrode film layer comprises a negative electrode active material.

The negative electrode current collector may be a conventional metal foil or a composite current collector (for example, a composite current collector can be formed by providing a metal material on a polymer substrate). As an example, the negative electrode current collector may be a copper foil.

The specific types of the negative electrode active materials are not limited, and active materials known in the art that can be used for the negative electrode of secondary batteries can be used, and the active materials can be selected by those of ordinary skill in the art according to actual requirements. As an example, the negative electrode active material can include, but is not limited to, one or more of synthetic graphite, natural graphite, hard carbon, soft carbon, a silicon-based material and a tin-based material. The silicon-based material can be selected from one or more of elemental silicon, a silicon oxide compound (for example, silicon(II) oxide), a silicon-carbon composite, a silicon-nitrogen composite, and a silicon alloy. The tin-based material can be selected from one or more of elemental tin, a tin oxide compound, and a tin alloy. These materials are all commercially available.

In some embodiments, in order to further improve the energy density of the battery, the negative electrode active material can comprise a silicon-based material.

The negative electrode film layer generally also comprises a bonder, a conductive agent and other optional auxiliary agents.

As an example, the conductive agent can be one or more of superconducting carbon, acetylene black, carbon black, Ketjen black, carbon dots, carbon nanotubes, graphene and carbon nanofibers.

As an example, the bonder can be one or more of a styrene-butadiene rubber (SBR), a water-based acrylic resin (water-based acrylic resin), polyvinylidene fluoride (PVDF), polytetrafluoroethylene (PTFE), an ethylene-vinyl acetate copolymer (EVA), polyvinyl alcohol (PVA) and polyvinyl butyral (PVB).

As an example, other optional auxiliary agents may be a thickening and dispersing agent (for example, sodium carboxymethyl cellulose, CMC-Na), a PTC thermistor material.

[Electrolyte]

The secondary battery can comprises an electrolyte, wherein the electrolyte is between the positive electrode and the negative electrode and functions for ionic conduction function. The electrolyte can comprise an electrolyte salt and a solvent.

As an example, the electrolyte salt can be selected from one or more of LiPF6 (lithium hexafluorophosphate), LiBF4 (lithium tetrafluoroborate), LiClO4 (lithium perchlorate), LiAsF6 (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), LiPO2F2 (lithium difluorophosphate), LiDFOP (lithium bisoxalatodifluorophosphate) and LiTFOP (lithium tetrafluorooxalate phosphate).

As an example, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte also comprises an additive. For example, the additive can include a negative electrode film-forming additive, a positive electrode film-forming additive, and also an additive that can improve certain performance of the battery, such as an additive that improve the overcharge performance of the battery, an additive that improve the high temperature performance of the battery, and an additive that improve the low temperature performance of the battery.

In some embodiments, the secondary battery can be a lithium-ion secondary battery.

Figure 6:
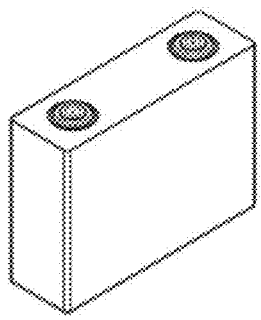
FIG. 6 is a schematic diagram of an embodiment of a secondary battery.

In embodiments of the present application, the shape of the secondary battery is not particularly limited, which can be a cylindrical shape, a prismatic shape or any other shapes. FIG. 6 shows a prismatic secondary battery 5 as an example.

In some embodiments, the secondary battery can comprises an outer package. The outer package is used for packaging the positive electrode plate, the negative electrode plate and the electrolyte.

Figure 7:
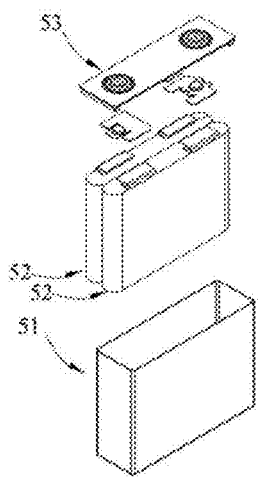
FIG. 7 is an exploded view of FIG. 6.

In some embodiments, referring to FIG. 7, the outer package can include a housing 51 and a cover plate 53, wherein the housing 51 can include a bottom plate and side plates connected to the bottom plate, and the bottom plate and the side plates enclose and form an accommodating cavity. The housing 51 has an opening in communication with the accommodating cavity, and the cover plate 53 can cover the opening to close the accommodating cavity.

The positive electrode plate, the negative electrode plate and the separator can form an electrode assembly 52 by a winding process or a lamination process. The electrode assembly 52 is packaged in the accommodating cavity. The electrolyte can be an electrode which infiltrates into the electrode assembly 52. The number of the electrode assemblies 52 contained in the secondary battery 5 may be one or more, and may be adjusted according to requirements.

In some embodiments, the outer package of the secondary battery can be a hard shell, for example, a hard plastic shell, an aluminum shell, and a steel shell. The outer package of the secondary battery can also be a soft bag, such as a pouch-type soft bag. The material of the soft bag can be a plastic, for example, including one or more of polypropylene (PP), polybutylene terephthalate (PBT), and polybutylene succinate (PBS).

In some embodiments, the secondary battery can be assembled into a battery module, and the number of the secondary batteries contained in the battery module can be multiple, and the specific number can be adjusted according to the application and capacity of the battery module.

Figure 8:
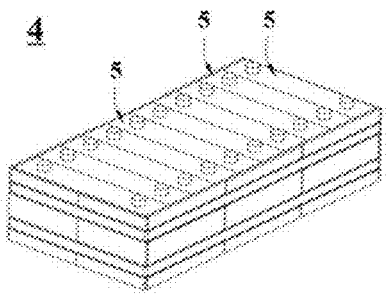
FIG. 8 is a schematic diagram of an embodiment of a battery module.

FIG. 8 shows a battery module 4 as an example. Referring to FIG. 8, in the battery module 4, a plurality of secondary batteries 5 can be provided sequentially in the length direction of the battery module 4. Apparently, the secondary batteries can also be disposed in any other manner. Furthermore, the plurality of secondary batteries 5 can be fixed by fasteners.

The battery module 4 may also comprise a housing with an accommodating space, and a plurality of secondary batteries 5 are accommodated in the accommodating space.

In some embodiments, the above battery module can also be assembled into a battery pack, and the number of the battery modules contained in the battery pack can be adjusted according to the application and capacity of the battery pack.

Figure 9:
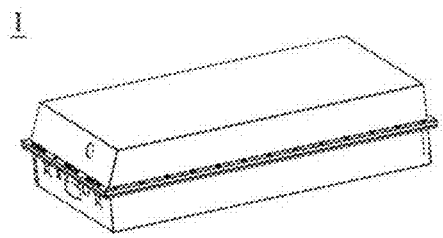
FIG. 9 is a schematic diagram of an embodiment of a battery pack.
Figure 10:
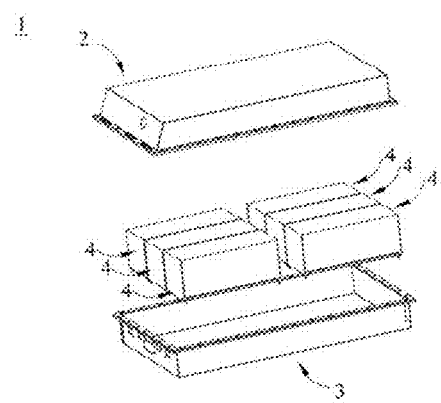
FIG. 10 is an exploded view of FIG. 9.

FIG. 9 and FIG. 10 show a battery pack 1 as an example. Referring to FIG. 9 and FIG. 10, the battery pack 1 can include a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be disposed in the battery case in any manner.

[Device]

The present application further provides a device which comprises at least one of the secondary battery, battery module, or battery pack. The secondary battery, battery module or battery pack can be used as a power source of the device, or as an energy storage unit of the device. The device can be, but is not limited to, a mobile device (such as a mobile phone, a laptop computer), an electric vehicle (such as a battery electric vehicle, a hybrid electric vehicle, a plug-in hybrid electric vehicle, an electric bicycle, an electric scooter, an electric golf cart, an electric truck), an electric train, a ship, a satellite, and an energy storage system.

The device can incorporate the secondary battery, battery module or battery pack according to its usage requirements.

Figure 11:
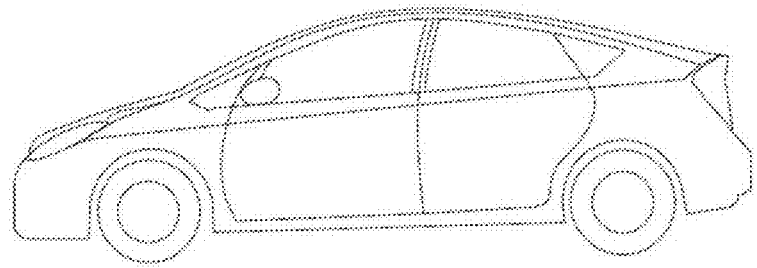
FIG. 11 is a schematic diagram of an embodiment of an device with a secondary battery as a power source.

FIG. 11 shows a device as an example. The device can be a battery electric vehicle, a hybrid electric vehicle, or a plug-in hybrid electric vehicle. In order to meet the requirements of the device for a high power and a high energy density of a secondary battery, a battery pack or a battery module can be used.

As another example, the device can be a mobile phone, a tablet computer, a laptop computer. The device is generally required to be thin and light, and may use a secondary battery as a power source.

The beneficial effects of the present application will be further described below in conjunction with embodiments.

In order to make the technical problems solved by, the technical solutions and the beneficial effects of the embodiments of the present application clearer, further detailed description will be given below with reference to the embodiments and the accompanying drawings. Apparently, the described embodiments are merely some of, but not all of, the embodiments of the present application. The following description of at least one exemplary embodiment is merely illustrative in nature and is in no way to limit the present application and the use thereof. All the other embodiments obtained by those of ordinary skill in the art based on the embodiments of the present application without any creative effort shall fall within the scope of protection of the present application.

I. Preparation of Separator

Separator 1:

(1) a PE substrate is provided, for example, the substrate having a thickness of 7 μm, and a porosity of 40%;

(2) formulation of coating slurry: inorganic particles of aluminum oxide ($Al_2O_3$), first organic particles of a vinylidene fluoride-hexafluoropropylene copolymer, second organic particles of a styrene-vinyl acetate-pyrrolidone copolymer, a dispersant of sodium carboxymethyl cellulose (CMC-Na), and a wetting agent of an organosilicon modified polyether at a mass ratio of 70:20:8:1:1 are uniformly mixed in an appropriate amount of a solvent of deionized water to obtain a coating slurry with a solid content of 38% (by weight), wherein the inorganic particles of aluminum oxide ($Al_2O_3$) have a volume-average particle size Dv50 of 1 μm, the first organic particles are secondary particles and have a number-average particle size of 8 μm and the second organic particles are primary particles and have a number-average particle size of 4.8 μm, at least part of the second organic particles comprise a core structure and a shell structure, the shell structure has a glass transition temperature of 58° C., and the core structure has a glass transition temperature of 20° C.;

(3) the two surfaces of the PE substrate are coated with the coating slurry formulated in step (2) by using a coating machine, followed by drying and slitting procedures, to obtain separator 1, wherein the gravure roller of the coating machine has a number of lines of 125 LPI, and the coating is carried out at a speed of 50 m/min, and a line speed ratio of 1.15; the drying is carried out at a temperature of 50° C. for a time of 25 s; and the separator has a single-sided coating weight per unit area of 2.3 g/m².

Materials used in the examples are all commercially available, for example:

the substrate can be purchased from Shanghai Enjie New Materials Co., Ltd.;

the inorganic particles can be purchased from Estone Materials Technology Co Ltd.;

the first organic particles can be purchased from Arkema (Changshu) Chemical Co., Ltd.;

the second organic particles can be purchased from Sichuan Indile Technology Co., Ltd.;

the dispersant can be purchased from Changshu Weiyi Technology Co., Ltd.

the wetting agent can be purchased from Dow Chemical Company; and

The preparation methods for separators 2-34 are similar to that for separator 1, except that: The material types of the first organic particles and the second organic particles, and the number-average particle sizes of the first organic particles and the second organic particles are adjusted, see Table 1 for details.

II. Preparation of Battery

Example 1

1. Preparation of Positive Electrode Plate

A positive electrode active material of $LiNi_{0.8}Co_{0.1}Mn_{0.1}O_2$ (NCM811), a conductive agent of carbon black (Super P), and a binder of polyvinylidene fluoride (PVDF) are uniformly mixed at a mass ratio of 96.2:2.7:1.1 in an appropriate amount of a solvent of N-methyl pyrrolidone (NMP), to obtain a positive electrode slurry; then the positive electrode slurry is coated onto a positive electrode current collector of aluminum foil, followed by drying, cold pressing, slitting and cutting procedures, to obtain a positive electrode plate. The positive electrode has an areal density of 0.207 mg/mm², and a compacted density of 3.5 g/cm³.

2. Preparation of Negative Electrode

A negative electrode active material of synthetic graphite, a conductive agent of carbon black (Super P), a bonder of a styrene-butadiene rubber (SBR) and sodium carboxymethyl cellulose (CMC-Na) are uniformly mixed at a mass ratio of 96.4:0.7:1.8:1.1 in an appropriate amount of a solvent of deionized water to obtain a negative electrode slurry; then the negative electrode slurry is coated onto a negative electrode current collector of copper foil, followed by drying, cold pressing, slitting and cutting procedures, to obtain a negative electrode plate. The negative electrode has an areal density of 0.126 mg/mm2, and a compacted density of 1.7 g/cm³.

3. Separator

Separator 1 prepared as above is used.

4. Preparation of Electrolyte

Ethylene carbonate (EC) and ethyl methyl carbonate (EMC) are mixed at a mass ratio of 30:70, to obtain an organic solvent; then a fully dried electrolyte salt of $LiPF_6$ is dissolved in the above mixed solvent, with an electrolyte salt concentration of 1.0 mol/L, and uniformly mixed to obtain an electrolyte.

5. Preparation of Secondary Battery

The positive electrode plate, the separator, and the negative electrode plate are laminated in sequence, such that the separator is located between the positive electrode plate and the negative electrode plate and functions for separation, and then they are wound to obtain an electrode assembly; the electrode assembly is placed in an outer package; the electrolyte prepared as above is injected into the dried secondary battery, followed by vacuum packaging, leaving to stand, formation, and shaping procedures to obtain a secondary battery.

The preparation methods for the secondary batteries in examples 2-26 and comparative examples 1-8 are similar to that for the secondary battery in example 1, except that different separators are used, see Table 1 for details.

III. Battery Performance Test

1. Cycling Performance at 25° C.

At 25° C., the secondary batteries prepared in the examples and comparative examples are charged at a constant current rate of 1 C to an end-of-charge voltage of 4.2 V, then charged at a constant voltage to a current of ≤0.05 C, left to stand for 5 min, then discharged at a constant current rate of 0.33 C to an end-of-discharge voltage of 2.8 V, and left to stand for 5 min; the battery capacity C0 at the moment is recorded. The battery is charged and discharged for 1500 cycles as per this method, and the battery capacity after 1500 cycles is recorded as C1.

The capacity retention rate during cycling of the battery at 25° C.=C1/C0×100%

2. Cycling Performance at 45° C.

At 45° C., the secondary batteries prepared in the examples and comparative examples are charged at a constant current rate of 1 C to an end-of-charge voltage of 4.2 V, then charged at a constant voltage to a current of ≤0.05 C, left to stand for 5 min, then discharged at a constant current rate of 0.33 C to an end-of-discharge voltage of 2.8 V, and left to stand for 5 min; the battery capacity of C0 at this moment is recorded. The battery is charged and discharged for 1500 cycles according to this method, and the battery capacity at this moment is recorded as C1.

The capacity retention rate during cycling of the battery at 45° C.=C1/C0×100%

3. Hot Oven Test

At 25° C., the secondary batteries prepared in the examples and comparative examples are charged at a constant current rate of 1 C to an end-of-charge voltage of 4.2 V, then charged at a constant voltage to a current of ≤0.05 C, and left to stand for 5 min; then each battery is tested in a DHG-9070A DHG series high-temperature oven with a fixture, wherein the temperature is increased from room temperature to 80° C.±2° C. at a rate of 5° C./min, and maintained for 30 min; then, the temperature is increased at a heating rate of 5° C./min, and the temperature is maintained for 30 minutes for each temperature rise of 5° C. until the battery cell fails; the time at which the battery cell begins to fail is recorded.

The tested battery performance of the examples and comparative examples is given in Table 1.

TABLE 1

| No. | First organic particle type | Number-average particle size of first organic particle (μm) | Structure of second organic particle | Material type of core and shell structure |
| --- | --- | --- | --- | --- |
| Example 1 | Separator 1 | Vinylidene fluoride-hexafluoropropylene copolymer | 8.0 | Comprising core and shell structures | Both being butyl methacrylate-isooctyl acrylate-styrene copolymer |
| Example 2 | Separator 2 | Vinylidene fluoride-hexafluoropropylene copolymer | 10.0 | Comprising core and shell structures | Both being butyl methacrylate-isooctyl acrylate-styrene copolymer |
| Example 3 | Separator 3 | Vinylidene fluoride-hexafluoropropylene copolymer | 12.0 | Comprising core and shell structures | Both being butyl methacrylate-isooctyl acrylate-styrene copolymer |
| Example 4 | Separator 4 | Vinylidene fluoride-hexafluoropropylene copolymer | 13.5 | Comprising core and shell structures | Both being butyl methacrylate-isooctyl acrylate-styrene copolymer |
| Example 5 | Separator 5 | Vinylidene fluoride-hexafluoropropylene copolymer | 15.0 | Comprising core and shell structures | Both being butyl methacrylate-isooctyl acrylate-styrene copolymer |
| Example 6 | Separator 6 | Vinylidene fluoride-hexafluoropropylene copolymer | 16.5 | Comprising core and shell structures | Both being butyl methacrylate-isooctyl acrylate-styrene copolymer |
| Example 7 | Separator 7 | Vinylidene fluoride-hexafluoropropylene copolymer | 18.0 | Comprising core and shell structures | Both being butyl methacrylate-isooctyl acrylate-styrene copolymer |
| Example 8 | Separator 8 | Vinylidene fluoride-hexafluoropropylene copolymer | 20.2 | Comprising core and shell structures | Both being butyl methacrylate-isooctyl acrylate-styrene copolymer |
| Example 9 | Separator 9 | Vinylidene fluoride-hexafluoropropylene copolymer | 22.0 | Comprising core and shell structures | Both being butyl methacrylate-isooctyl acrylate-styrene copolymer |

TABLE 1-continued

| | | | | | |
|---|---|---|---|---|---|
| Example 10 | Separator 10 | Vinylidene fluoride-hexafluoropropylene copolymer | 25.0 | Comprising core and shell structures | Both being butyl methacrylate-isooctyl acrylate-styrene copolymer |
| Example 11 | Separator 11 | Vinylidene fluoride-hexafluoropropylene copolymer | 270 | Comprising core and shell structures | Both being butyl methacrylate-isooctyl acrylate-styrene copolymer |
| Example 12 | Separator 12 | Vinylidene fluoride-hexafluoropropylene copolymer | 15.0 | Comprising core and shell structures | Both being butyl methacrylate-isooctyl acrylate-styrene copolymer |
| Example 13 | Separator 13 | Vinylidene fluoride-hexafluoropropylene copolymer | 15.0 | Comprising core and shell structures | Both being butyl methacrylate-isooctyl acrylate-styrene copolymer |
| Example 14 | Separator 14 | Vinylidene fluoride-hexafluoropropylene copolymer | 15.0 | Comprising core and shell structures | Both being butyl methacrylate-isooctyl acrylate-styrene copolymer |
| Example 15 | Separator 15 | Vinylidene fluoride-hexafluoropropylene copolymer | 15.0 | Comprising core and shell structures | Both being butyl methacrylate-isooctyl acrylate-styrene copolymer |
| Example 16 | Separator 16 | Vinylidene fluoride-hexafluoropropylene copolymer | 15.0 | Comprising core and shell structures | Both being butyl methacrylate-isooctyl acrylate-styrene copolymer |
| Example 17 | Separator 17 | Vinylidene fluoride-hexafluoropropylene copolymer | 15.0 | Comprising core and shell structures | Both being butyl methacrylate-isooctyl acrylate-styrene copolymer |
| Example 18 | Separator 18 | Vinylidene fluoride-hexafluoropropylene copolymer | 15.0 | Comprising core and shell structures | Both being butyl methacrylate-isooctyl acrylate-styrene copolymer |
| Example 19 | Separator 19 | Vinylidene fluoride-hexafluoropropylene copolymer | 15.0 | Comprising core and shell structures | Both being butyl methacrylate-isooctyl acrylate-styrene copolymer |
| Example 20 | Separator 20 | Polyethylene | 15.0 | Comprising core and shell structures | Both being butyl methacrylate-isooctyl acrylate-styrene copolymer |
| Example 21 | Separator 21 | Vinylidene fluoride-hexafluoropropylene acrylic acid copolymer | 15.0 | Comprising core and shell structures | Both being butyl methacrylate-isooctyl acrylate-styrene copolymer |
| Example 22 | Separator 22 | Vinylidene fluoride-hexafluoropropylene copolymer | 15.0 | Comprising core and shell structures | Both being butyl methacrylate-isooctyl acrylate-styrene copolymer |
| Example 23 | Separator 23 | Vinylidene fluoride-hexafluoropropylene copolymer | 15.0 | Comprising core and shell structures | Both being butyl methacrylate-isooctyl acrylate-styrene copolymer |
| Example 24 | Separator 24 | Vinylidene fluoride-hexafluoropropylene copolymer | 15.0 | Comprising core and shell structures | Both being butyl methacrylate-isooctyl acrylate-styrene copolymer |
| Example 25 | Separator 25 | Polyethylene | 15.0 | Comprising core and shell structures | Both being butyl methacrylate-isooctyl acrylate-styrene copolymer |
| Example 26 | Separator 26 | Polytetrafluoroethylene | 15.0 | Comprising core and shell structures | Both being butyl methacrylate-isooctyl acrylate-styrene copolymer |
| Comparative Example 1 | Separator 27 | Vinylidene fluoride-hexafluoropropylene copolymer | 1.0 | No | / |
| Comparative Example 2 | Separator 28 | Vinylidene fluoride-hexafluoropropylene copolymer | 10.0 | No | / |
| Comparative Example 3 | Separator 29 | Vinylidene fluoride-hexafluoropropylene copolymer | 1.0 | No | Both being butyl methacrylate-isooctyl acrylate-styrene copolymer |

TABLE 1-continued

| | | | | | |
|---|---|---|---|---|---|
| Comparative Example 4 | Separator 30 | Vinylidene fluoride-hexafluoropropylene copolymer | 10.0 | No | Both being butyl methacrylate-isooctyl acrylate-styrene copolymer |
| Comparative Example 5 | Separator 31 | Vinylidene fluoride-hexafluoropropylene copolymer | 1.0 | Comprising core and shell structures | Both being butyl methacrylate-isooctyl acrylate-styrene copolymer |
| Comparative Example 6 | Separator 32 | Vinylidene fluoride-hexafluoropropylene copolymer | 10.0 | Comprising core and shell structures | Both being butyl methacrylate-isooctyl acrylate-styrene copolymer |
| Comparative Example 7 | Separator 33 | Vinylidene fluoride-hexafluoropropylene copolymer | 15.0 | No | Styrene-vynil acetate-pyrrolidone copolymer |
| Comparative Example 8 | Separator 34 | Vinylidene fluoride-hexafluoropropylene copolymer | 6.0 | Comprising core and shell structures | Both being styrene-vynil acetate-pyrrolidone copolymer |

| | Number-average particle size of second organic particle (μm) | Ratio in number-average particle size of first to second organic particle | Failure temperature (° C.) | Cycling performance | |
|---|---|---|---|---|---|
| | | | | Performance capacity retention rate at 25° C., 1500 cycles (%) | Performance capacity retention rate at 45° C., 1500 cycles (%) |
| Example 1 | 4.8 | 1.7 | 120 | 70 | 72 |
| Example 2 | 4.8 | 2.1 | 130 | 78 | 78 |
| Example 3 | 4.8 | 2.5 | 130 | 79 | 79 |
| Example 4 | 4.8 | 2.8 | 135 | 79 | 83 |
| Example 5 | 4.8 | 3.1 | 140 | 85 | 86 |
| Example 6 | 4.8 | 3.4 | 140 | 86 | 86 |
| Example 7 | 4.8 | 3.8 | 135 | 85 | 86 |
| Example 8 | 4.8 | 4.2 | 130 | 84 | 84 |
| Example 9 | 4.8 | 4.6 | 130 | 84 | 86 |
| Example 10 | 4.8 | 5.2 | 130 | 84 | 85 |
| Example 11 | 4.8 | 5.6 | 125 | 75 | 80 |
| Example 12 | 2.0 | 7.5 | 135 | 81 | 84 |
| Example 13 | 3.0 | 5.0 | 135 | 82 | 82 |
| Example 14 | 3.5 | 4.3 | 140 | 84 | 86 |
| Example 15 | 4.2 | 3.6 | 135 | 82 | 84 |
| Example 16 | 3.8 | 2.6 | 130 | 80 | 81 |
| Example 17 | 6.5 | 2.3 | 130 | 78 | 80 |
| Example 18 | 7.0 | 2.1 | 125 | 75 | 79 |
| Example 19 | 10.0 | 1.5 | 120 | 70 | 73 |
| Example 20 | 4.8 | 3.1 | 135 | 82 | 84 |
| Example 21 | 4.8 | 3.1 | 135 | 82 | 85 |
| Example 22 | 4.8 | 3.1 | 135 | 82 | 87 |
| Example 23 | 4.8 | 3.1 | 135 | 84 | 85 |
| Example 24 | 2.0 | 7.5 | 135 | 80 | 83 |
| Example 25 | 4.8 | 3.1 | 130 | 80 | 81 |
| Example 26 | 4.8 | 3.1 | 135 | 85 | 84 |
| Comparative Example 1 | / | / | 115 | 50 | 54 |
| Comparative Example 2 | / | / | 120 | 60 | 62 |
| Comparative Example 3 | 1.0 | 1.0 | 115 | 46 | 48 |
| Comparative Example 4 | 1.0 | 10.0 | 120 | 66 | 75 |
| Comparative Example 5 | 1.0 | 1.0 | 120 | 65 | 65 |
| Comparative Example 6 | 1.0 | 10.0 | 125 | 68 | 76 |
| Comparative Example 7 | 4.8 | 3.1 | 120 | 68 | 73 |
| Comparative Example 8 | 4.8 | 1.3 | 120 | 61 | 63 |

It can be seen from Table 1 that by the use of first organic particles and second organic particles having a specific particle size and structure as defined in the present application, the cycling performance and safety performance of the battery can be significantly improved. Especially, by further selecting the number-average particle size, ratio and material type of the first organic particles and the second organic particles, the cycling performance and safety performance can be further improved. In contrast, for comparative examples 1 and 2 where only the first organic particles are used, and comparative examples 3, 4 and 7 where the second organic particles do not have a core and shell structure, the cycling performance and the safety performance are both worse than those of examples 1-26 of the present invention; although in comparative examples 5, 6, and 8 the second organic particle with a core and shell structure are used, the number-average particle size of the first organic particles or the number-average particle size of the second organic particles is not within the range defined by the present application; therefore, a good cycling performance and safety performance cannot be achieved.

The inventors also performed the experiments by using the inorganic particles, the first organic particles and the second organic particles falling within the range of the present application, but in other amounts and with other materials, other substrates, other coating process parameters and drying conditions, and obtained similar improvements in terms of cycling performance and safety performance of the batteries to those in examples 1-26.

Described above are merely specific embodiments of the present application, and the scope of protection of the present application is not limited thereto; any equivalent modification or replacement can be readily conceived by those of ordinary skill in the art according to the technical range of the disclosure of the present application, and shall fall within the protection scope of the present application. Therefore, the scope of protection of the present application shall be determined by the claims.

What is claimed is:

1. A separator, comprising:
   a substrate; and
   a coating formed on at least one surface of the substrate;
   wherein the coating comprises inorganic particles and organic particles, the inorganic particles form a layer on the at least one surface of the substrate, the organic particles further comprise first organic particles and second organic particles, the first organic particles and second organic particles are partially embedded in the layer formed by the inorganic particles and form protrusions on a surface of the coating;
   the first organic particles have a number-average particle size of ≥12 μm;
   the second organic particles have a number-average particle size of 3 μm to 8 μm, and each one of at least a portion of the second organic particles has a core-shell structure comprising a core and a shell;
   the core and the shell both comprise a copolymer of an acrylate monomeric unit and a styrene monomeric unit, wherein the acrylate monomeric unit comprises isooctyl acrylate or isooctyl methacrylate; and
   a glass transition temperature of the shell is higher than a glass transition temperature of the core.

2. The separator according to claim 1, wherein the first organic particles have a number-average particle size of 15 μm-25 μm.

3. The separator according to claim 1, wherein the second organic particles have a number-average particle size of 3 μm-6 μm.

4. The separator according to claim 1, wherein a ratio of the number-average particle size of the first organic particles to the number-average particle size of the second organic particles is ≥2.

5. The separator according to claim 1, wherein the first organic particles are secondary particles.

6. The separator according to claim 1, wherein the second organic particles are primary particles.

7. The separator according to claim 1, wherein the first organic particles comprise one or more from the group consisting of a homopolymer or copolymer of a fluorine-containing olefine monomeric unit, a homopolymer or copolymer of an olefine monomeric unit, a homopolymer or copolymer of an unsaturated nitrile monomeric unit, a homopolymer or copolymer of an alkylene oxide monomeric unit, and any combinations thereof.

8. The separator according to claim 1, wherein the first organic particles comprise a polymer selected from the group consisting of a vinylidene fluoride-trifluoroethylene copolymer, a vinylidene fluoride-hexafluoropropylene copolymer, a vinylidene fluoride-trifluoroethylene-hexafluoropropylene copolymer, a vinylidene fluoride-hexafluoropropylene-acrylic acid copolymer, a vinylidene fluoride-hexafluoropropylene-acrylate copolymer, and any combination thereof.

9. The separator according to claim 1, wherein the copolymer of the core and the shell is selected from the group consisting of a butyl acrylate-styrene copolymer, a butyl methacrylate-isooctyl methacrylate copolymer, an isooctyl methacrylate-styrene copolymer, a methacrylate-methacrylic acid-styrene copolymer, a methyl acrylate-isooctyl methacrylate-styrene copolymer, a butyl acrylate-isooctyl acrylate-styrene copolymer, a butyl acrylate-isooctyl methacrylate-styrene copolymer, a butyl methacrylate-isooctyl acrylate-styrene copolymer, a butyl methacrylate-isooctyl methacrylate-styrene copolymer, a styrene-acrylonitrile copolymer, a styrene-butadiene-acrylonitrile copolymer, a methyl acrylate-styrene-acrylonitrile copolymer, an isooctyl methacrylate-styrene-acrylonitrile copolymer, and any combination thereof.

10. The separator according to claim 1, wherein the inorganic particles comprise a metal compound selected from the group consisting of boehmite (γ-AlOOH), aluminum oxide (Al2O3), barium sulfate (BaSO4), magnesium oxide (MgO), magnesium hydroxide (Mg(OH)2), silicon dioxide (SiO2), tin dioxide (SnO2), titanium oxide (TiO2), calcium oxide (CaO), zinc oxide (ZnO), zirconium oxide (ZrO2), yttrium oxide (Y2O3), nickel oxide (NiO), cerium oxide (CeO2), zirconium titanate (SrTiO3), barium titanate (BaTiO3), magnesium fluoride (MgF2), and any combination thereof.

11. The separator according to claim 1, wherein:
   (1) a mass percentage of the inorganic particles in the coating is ≤70%;
   (2) a mass percentage of the first organic particles in the coating is ≥12%;
   (3) a mass percentage of the second organic particles in the coating is ≤10%; and
   (4) the separator has a single-sided coating weight per unit area of ≤3.0 g/m$^2$.

12. The separator according to claim 1, wherein:
   (1) the separator has an air permeability of 100 s/100 mL-300 s/100 ml;
   (2) the separator has a transverse tensile strength (MD) of 1500 kgf/cm$^2$-3000 kgf/cm$^2$;
   (3) the separator has a longitudinal tensile strength (TD) of 1000 kgf/cm$^2$-2500 kgf/cm$^2$;
   (4) the separator has a transverse elongation at break of 50%-200%; and
   (5) the separator has a longitudinal elongation at break of 50%-200%.

13. The separator according to claim 1, wherein the inorganic particles and the organic particles form a non-uniform pore structure in the coating.

14. The separator according to claim 1, wherein a spacing between any two adjacent inorganic particles is denoted as L1, and a spacing between any inorganic particle and an adjacent organic particle is denoted as L2, wherein L1<L2.

15. A secondary battery, comprising a positive electrode plate, a negative electrode plate, a separator disposed between the positive electrode plate and the negative electrode plate, and an electrolyte, wherein the separator comprises:
  a substrate; and
  a coating formed on at least one surface of the substrate;
  wherein the coating comprises inorganic particles and organic particles, the inorganic particles form a layer on the at least one surface of the substrate, the organic particles further comprise first organic particles and second organic particles, the first organic particles and second organic particles are partially embedded in the layer formed by the inorganic particles and form protrusions on a surface of the coating;
  the first organic particles have a number-average particle size of 12 μm to 25 μm;
  the second organic particles have a number-average particle size of 3 μm to 8 μm, and each one of at least a portion of the second organic particles has a core-shell structure comprising a core and a shell;
  the core and the shell both comprise a copolymer of an acrylate monomeric unit and a styrene monomeric unit, wherein the acrylate monomeric unit comprises isooctyl acrylate and isooctyl methacrylate; and
  a glass transition temperature of the shell is higher than a glass transition temperature of the core.

16. The separator according to claim 9, wherein the copolymer of the core and shell is a butyl methacrylate-isooctyl methacrylate-styrene copolymer.

17. The secondary battery according to claim 15, wherein the copolymer of the core and shell is a butyl methacrylate-isooctyl methacrylate-styrene copolymer.

18. A separator, comprising:
  a substrate; and
  a coating formed on at least one surface of the substrate;
  wherein the coating comprises inorganic particles and organic particles, the inorganic particles form a layer on the at least one surface of the substrate, the organic particles further comprise first organic particles and second organic particles, the first organic particles and second organic particles are partially embedded in the layer formed by the inorganic particles and form protrusions on a surface of the coating;
  the first organic particles have a number-average particle size of ≥12 μm;
  the second organic particles have a number-average particle size of 3 μm to 8 μm, and each one of at least a portion of the second organic particles has a core-shell structure comprising a core and a shell;
  the core and the shell of the second organic particles comprise a copolymer of an acrylate monomeric unit and a styrene monomeric unit, wherein the acrylate monomeric unit comprises isooctyl acrylate or isooctyl methacrylate;
  a glass transition temperature of the shell is higher than a glass transition temperature of the core; and
  the inorganic particles and the organic particles form a non-uniform pore structure in the coating.

* * * * *